US010866877B2

(12) United States Patent
Harer et al.

(10) Patent No.: US 10,866,877 B2
(45) Date of Patent: Dec. 15, 2020

(54) AUTOMATED REPAIR OF BUGS AND SECURITY VULNERABILITIES IN SOFTWARE

(71) Applicant: The Charles Stark Draper Laboratory, Inc., Cambridge, MA (US)

(72) Inventors: Jacob Harer, Mansfield, MA (US); Tomo Lazovich, Cambridge, MA (US); Rebecca Russell, Cambridge, MA (US); Onur Ozdemir, Arlington, MA (US); Louis Kim, Cambridge, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

(21) Appl. No.: 16/189,353

(22) Filed: Nov. 13, 2018

(65) Prior Publication Data
US 2020/0151081 A1    May 14, 2020

Related U.S. Application Data

(60) Provisional application No. 62/585,416, filed on Nov. 13, 2017.

(51) Int. Cl.
*G06F 9/44* (2018.01)
*G06F 11/36* (2006.01)
(Continued)

(52) U.S. Cl.
CPC ....... *G06F 11/3604* (2013.01); *G06N 3/0454* (2013.01); *G06N 3/08* (2013.01)

(58) Field of Classification Search
CPC ..... G06F 11/3604; G06N 3/0454; G06N 3/08
See application file for complete search history.

(56) References Cited

U.S. PATENT DOCUMENTS

2014/0173563 A1*  6/2014  Dias ................... G06F 8/36
                                                    717/123
2019/0114348 A1*  4/2019  Gao .................. G06F 16/2343

FOREIGN PATENT DOCUMENTS

WO    20150191731 A1    12/2015

OTHER PUBLICATIONS

Nadia Medeiros et al., Software Metrics as Indicator Security Vulnerabilities, IEEE, 2017, retrieved online on Aug. 27, 2020, pp. 216-227. Retrieved from the Internet: <ULR: https://ieeexplore.ieee.org/stamp/stamp.jsp?tp=&arnumber=8109088>. (Year: 2017).*

(Continued)

*Primary Examiner* — Hanh Thi-Minh Bui
(74) *Attorney, Agent, or Firm* — Hamilton, Brook, Smith & Reynolds, P.C.

(57) ABSTRACT

A software instruction code repair system comprising an instruction code example pool. The example pool comprises a set of good instruction code examples and a set of bad instruction code examples. The software instruction code repair system further comprises a sequence-to-sequence (seq2seq) network that is configured to generate a corrected instruction code example, based on one example of the set of bad instruction code examples. The software instruction code repair system further comprises a discriminator configured to randomly select one of the corrected instruction code example and one instruction code example of the set of good instruction code examples to produce a selected instruction code example. The discriminator is further configured to make a determination that the selected instruction code example is most likely taken either the instruction code example pool or the seq2seq network.

14 Claims, 5 Drawing Sheets

(51) Int. Cl.
    *G06N 3/04*    (2006.01)
    *G06N 3/08*    (2006.01)

(56) References Cited

OTHER PUBLICATIONS

Devlin et al: "Semantic Code Repair using Neuro-Symbolic Transformation Networks", Oct. 30, 2017 https://arxiv.org/pdf/1710.11054.pdf [retrieved on Feb. 6, 2019].

Le Goues et al: "GenProg: A Generic Method for Automatic Software Repair", IEEE Transactions on Software Engineering., vol. 38, No. 1, Jan. 1, 2012 (Jan. 1, 2012), pp. 54-72.

Gupta et al.: "DeepFix: Fixing Coll1llon C Language Errors by Deep Learning", Proceedings of the Thirty-First AAAI Conference on Artificial Intelligence, Feb. 4, 2017 (Feb. 4, 2017), pp. 1345-1351.

International Search Report and Written Opinion for PCT/US2018/060747 dated Feb. 26, 2019 entitled "Automated Repair of Bugs and Security Vulnerabilities in Software".

International Preliminary Report on Patentability for PCT/US2018/060747 dated May 28, 2020 titled "Automated Repair of Bugs and Security Vulnerabilities in Software".

* cited by examiner

AUTOMATED REPAIR OF BUGS AND SECURITY VULNERABILITIES IN SOFTWARE

RELATED APPLICATIONS

This application claims the benefit of U.S. Provisional Application No. 62/585,416, filed on Nov. 13, 2017. The entire teachings of the above applications are incorporated herein by reference.

GOVERNMENT SUPPORT

This invention was made with government support under FA8750-15-C-0242 from U.S. Department of Defense. The government has certain rights in the invention.

BACKGROUND

Writing and subsequent validating (e.g., debugging or repairing) of software instruction code is often a time-consuming process. Reducing or eliminating human involvement, particularly in the validation aspect, is desirable, because doing so increases efficiency and reduces costs.

Existing efforts to automate instruction code debug and/or repair have various associated drawbacks. For example, sequence to sequence (seq2seq) techniques (described in more detail herein) have been shown to perform well on datasets such as language translation and language correction, and efforts are ongoing to extend seq2seq techniques to correction of software instruction codes. One of the major downsides to seq2seq, and indeed most of the previous work on sequence correction, is that it requires the data be in pairs of incorrect to correct code. The models are then trained to perform the correction provided given the incorrect code. This type of data can be difficult to obtain, and is most likely required to be hand annotated.

SUMMARY

The described embodiments are directed to automatically correcting flaws in software source code without humans in the loop. Many software bugs (i.e., flaws in source code) go undetected for long periods of time. The described embodiments employ novel machine learning techniques that will take in a flawed or buggy piece of source code and automatically output a corrected version of the source code. While the described embodiments are described with respect to C/C++ source code, the underlying concepts of the described embodiments may be generalized to accommodate any software language. Further, the described embodiments may be used to in other applications, for example natural language correction. In fact, the underlying concepts of the described embodiments may be generally applied to any application characterized by a sequence that may have an improved "good" state associated with an initial "bad" state.

Novel aspects of the described embodiments include, but are not limited to, (i) the use of a sequence to sequence (seq2seq) network model as a generator in a Generative Adversarial Network (GAN) architecture, and (ii) the application of such a GAN architecture to repair or otherwise correct flaws in software instruction code (i.e., producing "good," corrected instruction code from "bad," buggy instruction code, based on examples of real, confirmed good software instruction code).

In one aspect, the invention may be a sequential data repair system comprising an example pool comprising a set of good examples and a set of bad examples, a sequence-to-sequence (seq2seq) network configured to generate a corrected example based on an example of the set of bad examples, and a discriminator. The discriminator may be configured to randomly select either the corrected example or an example of the set of good examples, so as to produce a selected example, and make a determination from which source the selected example was most likely selected—the example pool or the seq2seq network.

The discriminator and seq2seq network may be configured as a generative adversarial network (GAN). The seq2seq network may comprise an encoder configured to produce an intermediate representation of an input data sequence, and a decoder configured to produce and output data sequence based on the intermediate representation of the input data sequence.

In an embodiment, each good example in the set of good examples may represent a sequence of data elements having a quality that equals or exceeds a threshold quality level of sequential data associated with the sequential data repair system. Each bad example in the set of bad examples may represent a sequence of data elements having a quality that is less than or equal to a minimum threshold quality level of sequential data associated with the sequential data repair system. Each bad example in the set of bad examples may be labeled to indicate a bad example, and each good example in the set of good examples is labeled to indicate a good example.

The discriminator may generate a training error signal based on the determination. The seq2seq network may comprise a deep learning neural network model, and the seq2seq network may use the training error signal to train the deep learning neural network model.

In another aspect, the invention may be a software instruction code repair system comprising an instruction code example pool comprising a set of good instruction code examples and a set of bad instruction code examples, a sequence-to-sequence (seq2seq) network configured to generate a corrected instruction code example based on one example of the set of bad instruction code examples, and a discriminator. The discriminator may be configured to randomly select either the corrected instruction code example or an instruction code example of the set of good instruction code examples, to produce a selected instruction code example, and make a determination that the selected instruction code example was most likely selected from either the instruction code example pool or the seq2seq network.

In another aspect, the invention may be a method of repairing a sequence of data elements, comprising providing a set of good instruction code examples and a set of bad instruction code examples, generating, using a sequence-to-sequence (seq2seq) network, a corrected instruction code example based on one example of the set of bad instruction code examples, randomly selecting, using a discriminator, either the corrected instruction code example or an instruction code example of the set of good instruction code examples, to produce a selected instruction code example, and making a determination that the selected instruction code example was most likely selected from a particular source—either the instruction code example pool or the seq2seq network.

BRIEF DESCRIPTION OF THE DRAWINGS

The foregoing will be apparent from the following more particular description of example embodiments, as illus

DETAILED DESCRIPTION

A description of example embodiments follows.

The teachings of all patents, published applications and references cited herein are incorporated by reference in their entirety.

The described embodiments are directed to methods of and systems for automated processing of software instruction code. Related information in this general technology field may also be found in U.S. patent application Ser. No. 14/735,639, entitled "Systems And Methods For Software Analysis," filed on Jun. 10, 2015, the entire contents of which are hereby incorporated by reference.

The described embodiments are directed to a technique for training a neural network model to perform repairs on source code, without the need for good/bad examples of the same piece of code to use for training. This technique is referred to herein as "RepairGAN."

In general, RepairGAN is a deep learning neural network model configured to learn how to repair sequential data without the need for paired training examples to demonstrate fixes. Instead, the network trains purely on labels associated with individual examples. In short, the network can learn how to translate bad or non-compliant designs into good designs by observing many individual examples of both bad and good cases.

RepairGAN is a combination of two existing, commonly used techniques in the machine learning community: (i) sequence-to-sequence (seq2seq) networks and (ii) generative adversarial networks (GANs). The seq2seq network learns how to take in a sequence of data and output a transformed sequence. The GAN training setup is used to "adversarially train" the seq2seq network so that it learns how to transform bad sequences into good sequences, without needing examples of good/bad pairs.

One example use of seq2seq networks is machine translation. Given an input sequence of tokens from a sentence in one language, the seq2seq network may be trained to output the same sentence in a different language. Seq2seq networks may also be effective for grammar correction.

Figure 1:
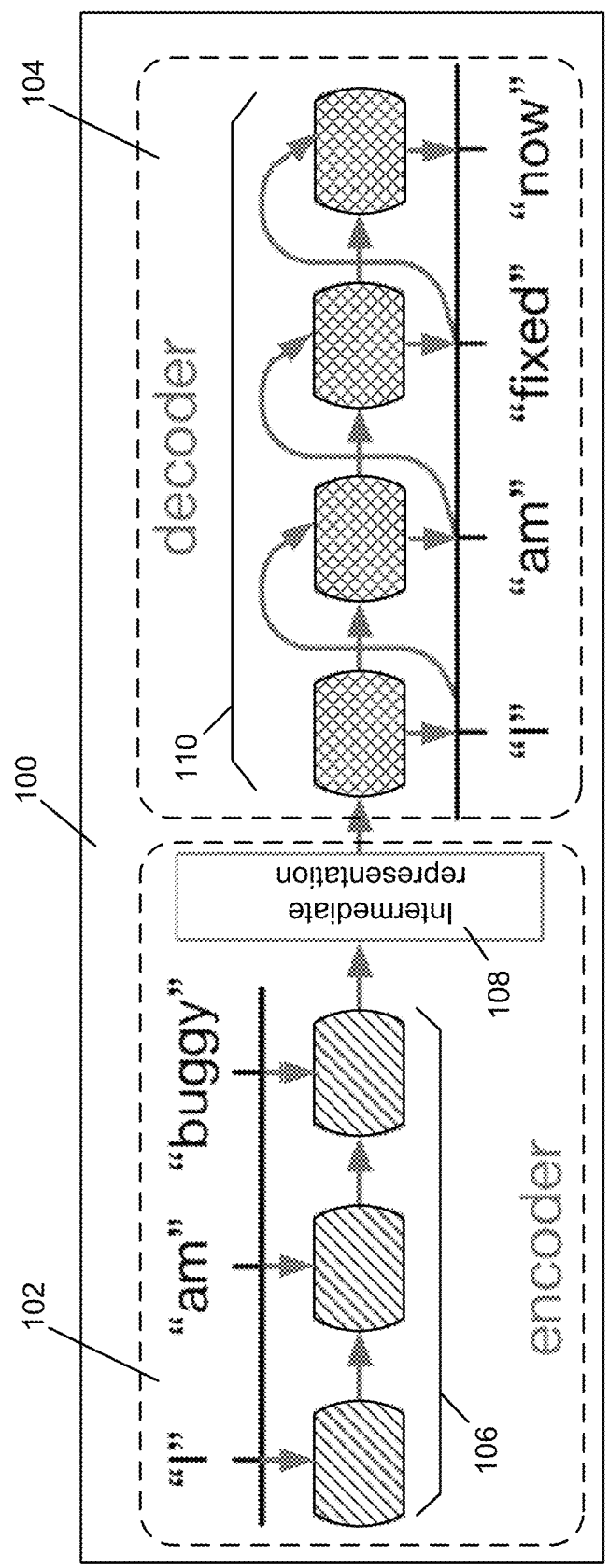
- FIG. 1 shows the basic operation of the seq2seq network model.

FIG. 1 illustrates the basic operation of the seq2seq network model 100. The seq2seq network model 100 comprises an encoder network 102 and a decoder network 104. The encoder network 102 takes in a first sequence of tokens 106, and maps the first sequence of tokens 106 into an encoded vector representation 108 (also referred to herein as an intermediate representation). The decoder network 104 takes in the intermediate representation 108 and outputs a second sequence of tokens 110. For example, the encoder network 102 may take in an English sentence, and map the English sentence to the intermediate representation 108. The decoder network 104 may then read in this intermediate representation 108 and output a corresponding French sentence.

The seq2seq network model may be used to "translate" buggy code into correct code. The best translation networks may be trained on hundreds of millions of sentence pair examples, where the input sentence and corresponding output sentence are known. Obtaining this many examples in the software domain is virtually impossible. The described embodiments of the RepairGAN approach, described herein, may be used to avoid a need for such large numbers of input/output training pairs. Thus, while seq2seq networks are powerful, it is difficult to find enough data in most domains on which to train them. Therefore, the described embodiments combine a seq2seq networks with another network, the generative adversarial network, to make a robust, trainable repair system.

Figure 2:
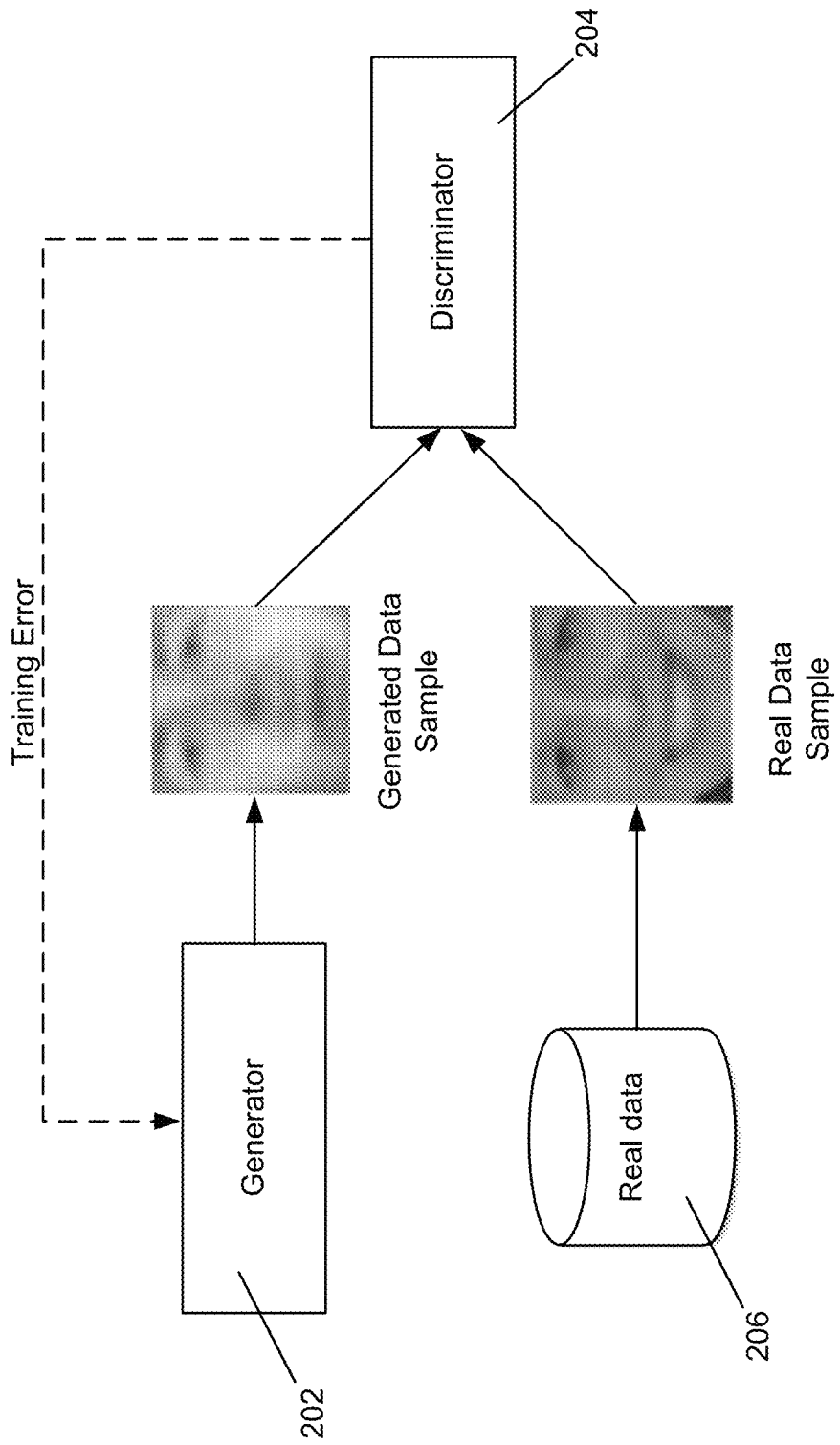
FIG. 2 shows an example of a generative adversarial network (GAN).

Generative adversarial networks (GAN) utilize a model that is trained to generate data associated with a particular training set. In the example embodiment shown in FIG. 2, the generated data is a set of celebrity head-shots. The GAN comprises a generator network 202 and a discriminator network 204, which compete in a minimax game. The discriminator network 204 randomly (e.g., blindly or arbitrarily) takes in a data point with a goal of determining whether the selected data point was sampled from the true data distribution (i.e., the training set 206—stored in, e.g., a database or other data storage facility), or from the generator network 202 directly. The goal of the generator network 202 is produce a generated image, of a quality level that is so close to the real data distribution, such that the discriminator network 204 will be "fooled" into making a determination that the generated image was sampled from the real data distribution. Through feedback from the discriminator network 204, the generator network 202 thus learns how to generate very realistic looking data samples.

Figure 3:
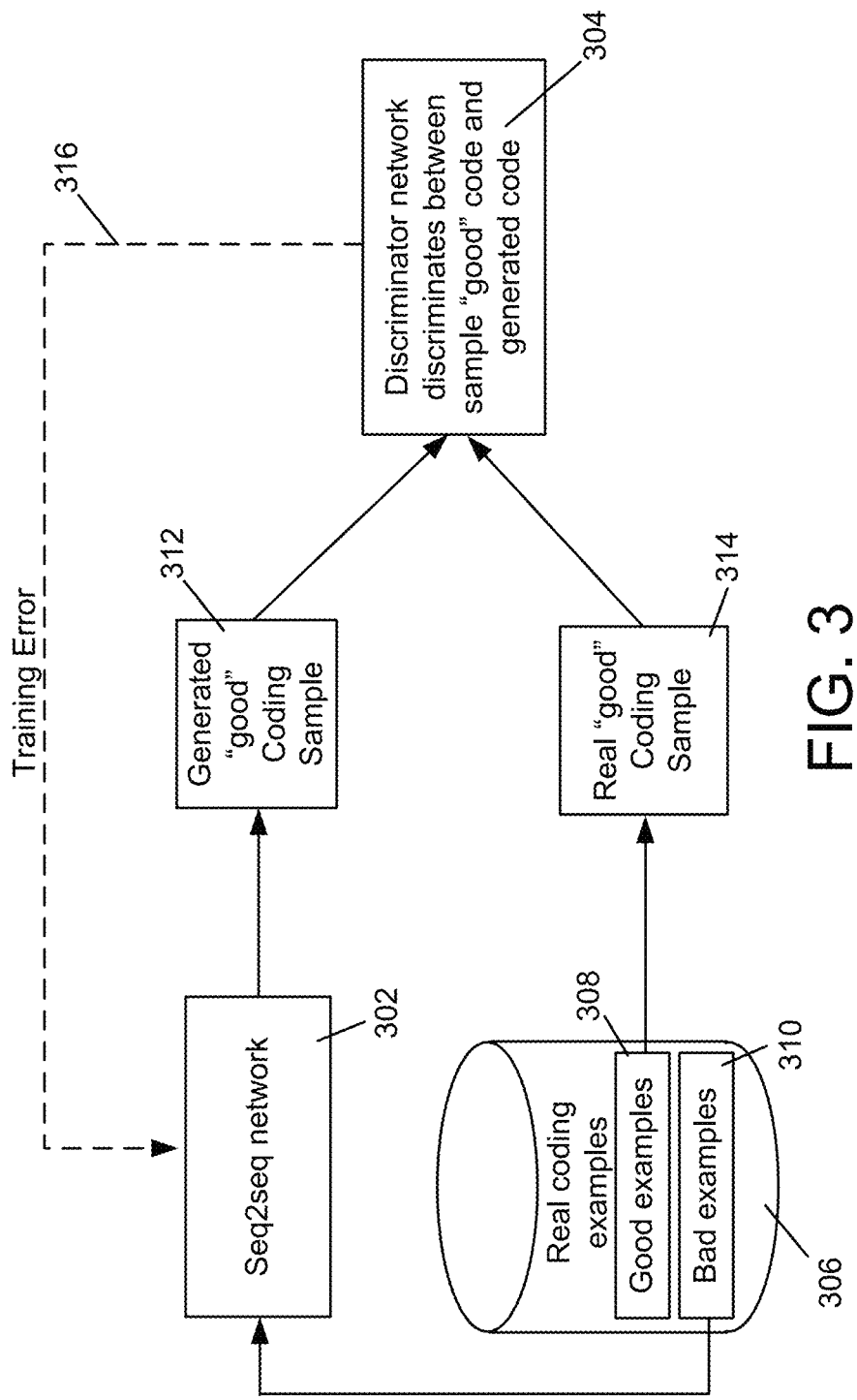
FIG. 3 shows an example embodiment of a code repair system according to the invention.

The RepairGAN approach of the described embodiments employs a novel use of the GAN discriminator network 204 described herein. FIG. 3 is an example embodiment of a code repair system according to the invention. Rather than simply discriminating between generated and real examples, the RepairGAN discriminator network 304 is also trained to distinguish between (i) good coding examples from the training set, and (ii) good coding examples that have been generated by the generator network based on bad coding instances.

The seq2seq network 100, described herein, is employed as the RepairGAN generator network 302. A training set of real coding examples 306, comprising both good examples 308 and bad examples 310, is stored in a coding pool (e.g., database or other storage facility). The bad examples 310 are provided to the seq2seq network 302. Samples 312 from the "generated" distribution are made by feeding known bad examples 310 into the seq2seq network 302 and obtaining a corrected, "good" example 312 from the output of the decoder. The seq2seq network 302 uses feedback 316 from the discriminator 304 to improve its sequence conversion ability, with the goal of generating a good coding example 312 from a bad coding example 310, such that the generated coding example approaches or matches the quality of the good coding example 308. Thus, the seq2seq network 302 learns how to transform know bad examples into examples that "look like" good examples.

The "good" coding examples 314 are sampled from a known good coding example distribution 308, which are stored in the real coding pool 306. Each of the coding examples 312, 314, provided to the discriminator 304, includes a label (e.g., "good_real," "good_generated") that characterizes the coding example. The discriminator network 304 uses the labels to provide training error feedback 316 to the seq2seq network 302. The training error feedback may reflect the quality of the generated coding sample 312 relative to the real coding sample 314. Using this feedback 316, the seq2seq network learns how to transform known bad examples into generated examples 312 that look like the real good examples 314. The labels may be used to update the discriminator as well. The label may be used to both train the discriminator to be better at differentiating real examples from generated examples, and to update the generator to better fool the discriminator.

A significant advantage of the described embodiments is that individual labeled examples may be used, rather than fully paired before-and-after examples of the same piece of code. The use of labeled examples thus significantly reduces difficulty of needing to obtain data required to train the seq2seq network 302, as compared to other such network architectures.

When benchmarked on a synthetic grammar repair problem, an example code repair system, constructed according to the described embodiments, was able to repair 64 percent of broken sentences on a single pass. Similarly, the example code repair system repaired about 20 percent of broken code examples on its first attempt.

Figure 4:
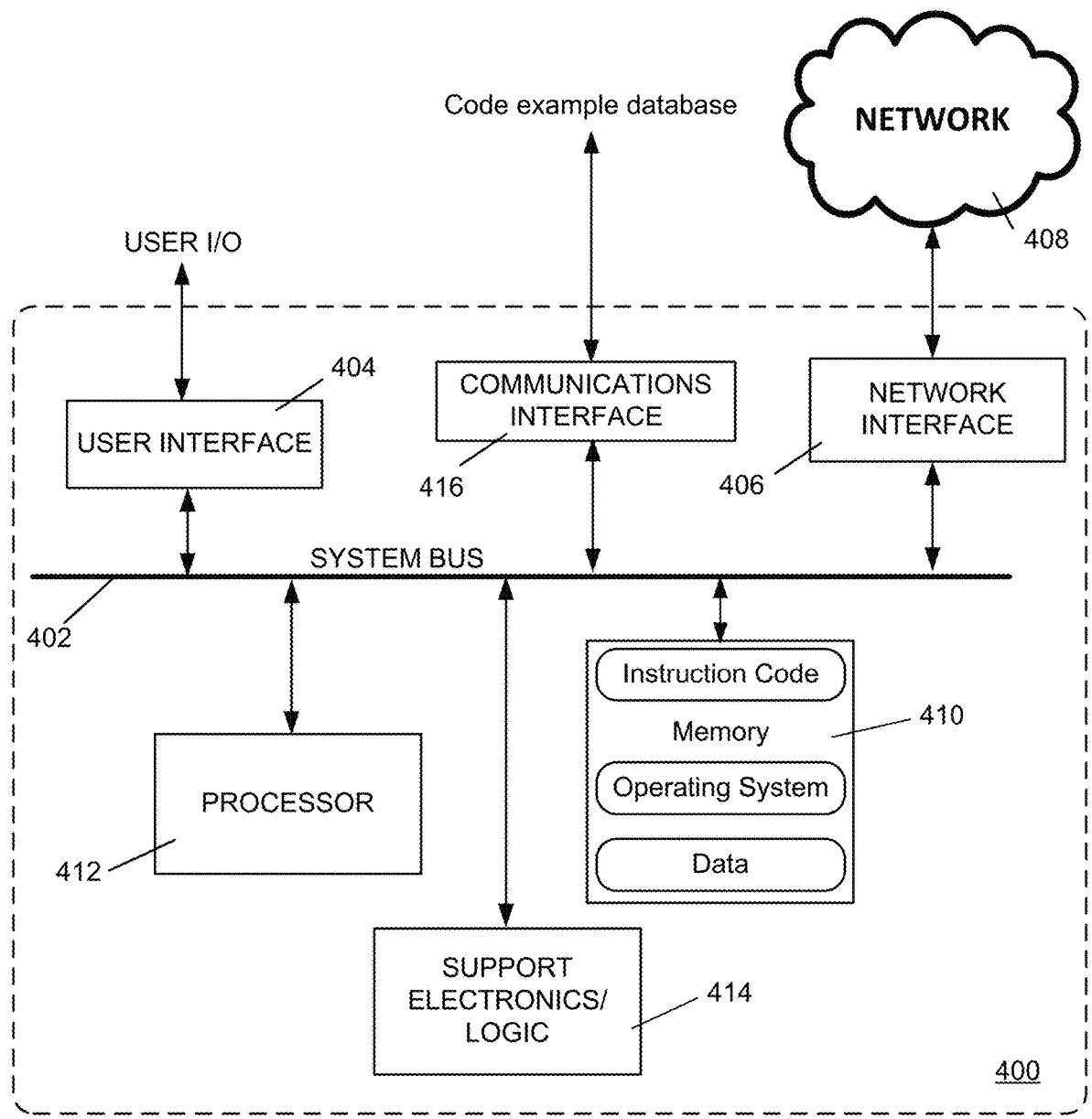
FIG. 4 shows an example embodiment of an internal structure of a processing system that may be used to implement one or more of the embodiments herein.

FIG. 4 is a diagram of an example internal structure of a processing system 400 that may be used to implement one or more of the embodiments herein. Each processing system 400 contains a system bus 402, where a bus is a set of hardware lines used for data transfer among the components of a computer or processing system. The system bus 402 is essentially a shared conduit that connects different components of a processing system (e.g., processor, disk storage, memory, input/output ports, network ports, etc.) that enables the transfer of information between the components.

Attached to the system bus 402 is a user I/O device interface 404 for connecting various input and output devices (e.g., keyboard, mouse, displays, printers, speakers, etc.) to the processing system 400. A network interface 406 allows the computer to connect to various other devices attached to a network 408. Memory 410 provides volatile and non-volatile storage for information such as computer software instructions used to implement one or more of the embodiments of the present invention described herein, for data generated internally and for data received from sources external to the processing system 400.

A central processor unit 412 is also attached to the system bus 402 and provides for the execution of computer instructions stored in memory 410. The system may also include support electronics/logic 414, and a communications interface 416. The communications interface may, for example, receive good and bad code examples from a data storage facility as described herein.

In one embodiment, the information stored in memory 410 may comprise a computer program product, such that the memory 410 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Figure 5:
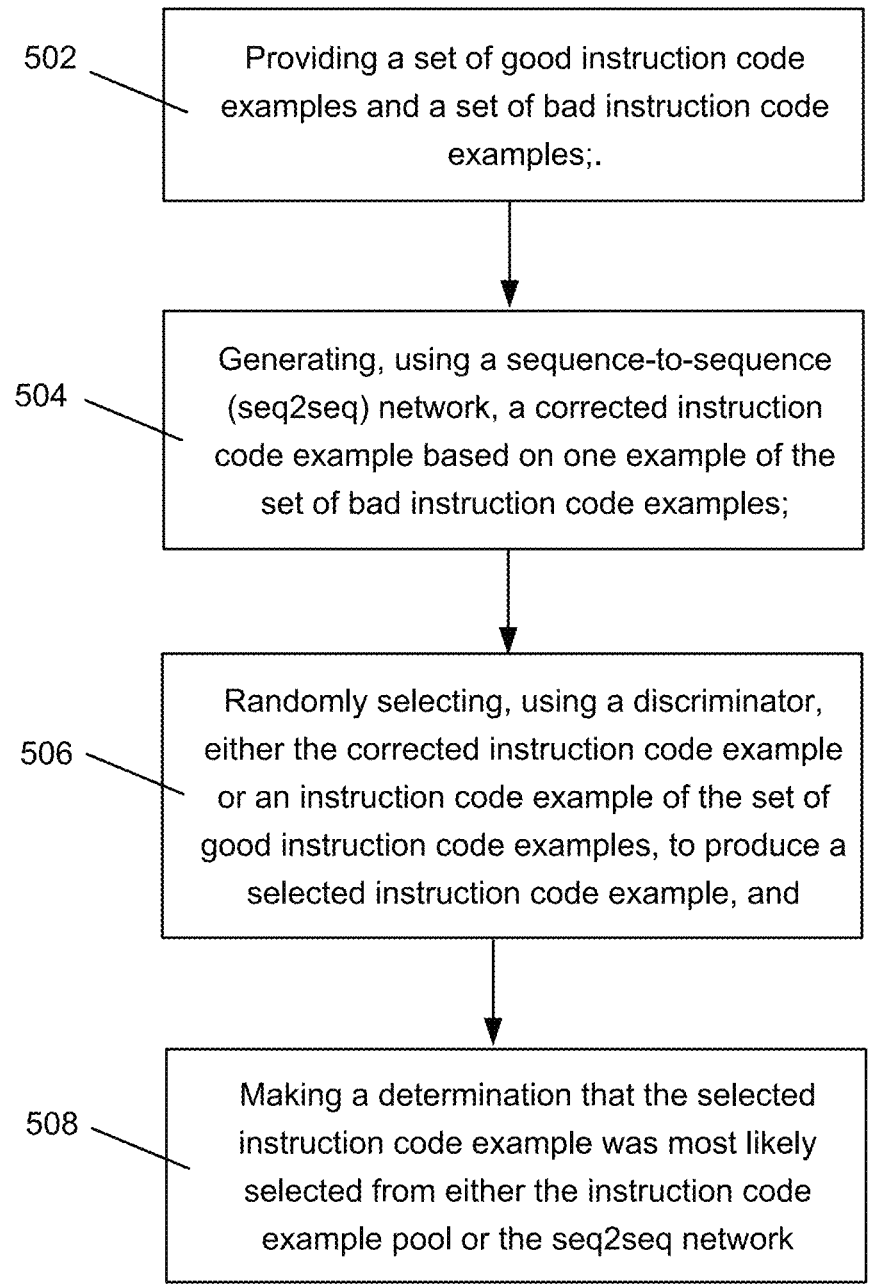
FIG. 5 illustrates an example embodiment of a method of repairing a sequence of data elements.

FIG. 5 illustrates an example embodiment of a method of repairing a sequence of data elements, comprising providing 502 a set of good instruction code examples and a set of bad instruction code examples, and generating 504, using a sequence-to-sequence (seq2seq) network, a corrected instruction code example based on one example of the set of bad instruction code examples. The method may further comprise randomly selecting 506, using a discriminator, either the corrected instruction code example or an instruction code example of the set of good instruction code examples, to produce a selected instruction code example, and making a determination 508 that the selected instruction code example was most likely selected from either the instruction code example pool or the seq2seq network.

While example embodiments have been particularly shown and described, it will be understood by those skilled in the art that various changes in form and details may be made therein without departing from the scope of the embodiments encompassed by the appended claims.

What is claimed is:

1. A sequential data repair system, comprising:
   an example pool of sequential data examples stored on a data storage device, the example pool of sequential data examples comprising a set of good examples and a set of bad examples;
   a computer-based sequence-to-sequence (seq2seq) network that comprises a deep learning neural network model, the seq2seq configured to communicate with the data storage device to receive an example of the set of bad examples and to generate a corrected example based on the example of the set of bad examples;
   a computer-based discriminator configured to communicate with the data storage device and the seq2seq network, and to:
   (a) randomly select either the corrected example or an example of the set of good examples, to produce a selected example, and
   (b) make a determination that the selected example was most likely selected from the example pool or the seq2seq network;

(c) generate a training error signal based on the determination, the seq2seq network uses the training error signal to train the deep learning neural network model; and
a user interface configured to present the corrected example to a user.

2. The sequential data repair system of claim 1, wherein the discriminator and seq2seq network are configured as a generative adversarial network (GAN).

3. The sequential data repair system of claim 1, wherein the seq2seq network comprises an encoder configured to produce an intermediate representation of an input data sequence, and a decoder configured to produce and output data sequence based on the intermediate representation of the input data sequence.

4. The sequential data repair system of claim 1, wherein each good example in the set of good examples represents a sequence of data elements having a quality that equals or exceeds a threshold quality level of sequential data associated with the sequential data repair system.

5. The sequential data repair system of claim 1, wherein each bad example in the set of bad examples represents a sequence of data elements having a quality that is less than or equal to a minimum threshold quality level of sequential data associated with the sequential data repair system.

6. The sequential data repair system of claim 1, wherein each bad example in the set of bad examples is labeled to indicate a bad example, and each good example in the set of good examples is labeled to indicate a good example.

7. A software instruction code repair system, comprising:
a pool of instruction code examples stored on a data storage device, the pool of instruction code examples comprising a set of good instruction code examples and a set of bad instruction code examples;
a computer-based sequence-to-sequence (seq2seq) network that comprises a deep learning neural network model, the seq2seq configured to communicate with the data storage device to receive an example of the set of bad examples and to generate a corrected instruction code example based on one example of the set of bad instruction code examples;
a computer-based discriminator configured to communicate with the data storage device and the seq2seq network, and to:
(a) randomly select either the corrected instruction code example or an instruction code example of the set of good instruction code examples, to produce a selected instruction code example, and
(b) make a determination that the selected instruction code example was most likely selected from either the instruction code example pool or the seq2seq network;
(c) generate a training error signal based on the determination, the seq2seq network uses the training error signal to train the deep learning neural network model; and
a user interface configured to present the corrected instruction code example to a user.

8. The software instruction code repair system of claim 7, wherein the discriminator and seq2seq network are configured as a generative adversarial network (GAN).

9. The software instruction code repair system of claim 7, wherein the seq2seq network comprises an encoder configured to produce an intermediate representation of an input software instruction code, and a decoder configured to produce and output code sequence based on the intermediate representation of the input software instruction code.

10. The software instruction code repair system of claim 7, wherein each good example in the set of good examples represents a software instruction code example having a quality that equals or exceeds a threshold quality level of software instruction code associated with the software instruction code repair system.

11. The software instruction code repair system of claim 7, wherein each bad example in the set of bad examples represents a software instruction code example having a quality that is less than or equal to a minimum threshold quality level of software instruction code associated with the software instruction code repair system.

12. The software instruction code repair system of claim 7, wherein each bad example in the set of bad examples is labeled to indicate a bad software instruction code example, and each good example in the set of good examples is labeled to indicate a good software instruction code example.

13. A method of repairing a sequence of data elements, comprising:
storing, on a data storage device, a set of good instruction code examples and a set of bad instruction code examples;
generating, using a computer-based sequence-to-sequence (seq2seq) network that comprises a deep learning neural network model, the seq2seq configured to communicate with the data storage device, a corrected instruction code example based on one example of the set of bad instruction code examples;
randomly selecting, using a computer-based discriminator, either the corrected instruction code example or an instruction code example of the set of good instruction code examples, to produce a selected instruction code example,
making a determination, using the computer-based discriminator, that the selected instruction code example was most likely selected from either the instruction code example pool or the seq2seq network;
generating a training error signal based on the determination, the seq2seq network uses the training error signal to train the deep learning neural network model; and
presenting, using a user interface, the corrected instruction code example.

14. The method of claim 13, further comprising configuring the discriminator and seq2seq network as a generative adversarial network (GAN).

* * * * *